(12) United States Patent
Ozdeger

(10) Patent No.: US 6,420,480 B1
(45) Date of Patent: Jul. 16, 2002

(54) WATERBORNE SILICONE ACRYLATE LATEX POLYMERS FOR RELEASE

(75) Inventor: Eser Ozdeger, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/567,540

(22) Filed: May 5, 2000

(51) Int. Cl.$^7$ ............................................... C08L 43/04
(52) U.S. Cl. ...................... 524/806; 524/837; 524/862; 428/447; 526/279; 528/24; 528/25; 528/28; 528/32; 106/287.15
(58) Field of Search ................. 524/806, 837, 524/862; 526/279; 528/24, 25, 28, 32; 428/447; 106/287.15

(56) References Cited

U.S. PATENT DOCUMENTS

| | | | |
|---|---|---|---|
| 3,203,919 A | * | 8/1965 | Brachman |
| 4,985,155 A | * | 1/1991 | Yamada et al. |
| 4,987,180 A | | 1/1991 | Ohata et al. |
| 5,171,638 A | | 12/1992 | Ozaki et al. |
| 5,202,368 A | | 4/1993 | Davies et al. ............... 524/266 |
| 5,462,988 A | | 10/1995 | Doi et al. |
| 5,516,865 A | | 5/1996 | Urquiola |
| 5,516,868 A | * | 5/1996 | Yamazaki et al. |
| 5,594,067 A | | 1/1997 | Doi et al. |
| 5,731,379 A | * | 3/1998 | Kennan et al. |
| 5,767,206 A | | 6/1998 | Ariagno et al. ............. 525/479 |
| 6,313,249 B1 | * | 11/2001 | Nakahishi et al. .......... 526/279 |

FOREIGN PATENT DOCUMENTS

| | | |
|---|---|---|
| EP | 0421588 | 4/1991 |
| EP | 0731137 | 9/1996 |
| EP | 0 757 059 A1 | 2/1997 |
| EP | 0 853 093 A1 | 7/1998 |
| EP | 0 899 281 B1 | 6/2000 |
| JP | 2-120720 | 5/1990 |
| JP | 3-43388 | 7/1991 |
| JP | 4-18009 | 1/1992 |
| JP | 5-78681 | 3/1993 |
| JP | 05311131 | 11/1993 |
| JP | 10-17840 | 3/2000 |

* cited by examiner

Primary Examiner—Robert Dawson
Assistant Examiner—Marc S. Zimmer
(74) Attorney, Agent, or Firm—Carolyn V. Peters

(57) ABSTRACT

Polymer latices are provided that are useful as release coatings for pressure-sensitive adhesive (PSA) coated paper and tapes. With the ever-present environmental concern to eliminate organic solvents, the use of 100% solids and water-based release coatings is becoming more desirable. The latices of the present invention are waterborne, which is an advantage over the more conventional release coating compositions that are usually comprised of solvent-based polymers, and possess good and stable release characteristics.

8 Claims, No Drawings

WATERBORNE SILICONE ACRYLATE LATEX POLYMERS FOR RELEASE

TECHNICAL FIELD

This invention relates to silicone acrylate latex polymers and in particular to silicone acrylate latex polymers prepared by emulsion polymerization and useful as release coatings.

BACKGROUND OF THE INVENTION

Generally, conventional release coating compositions are solvent-based polymers. They are typically prepared using solution polymerization in organic solvents. In an attempt to meet many environmentally driven standards to reduce or replace volatile organic solvents, efforts have been directed towards the development of waterborne release coatings and low adhesion backsize coatings. Furthermore, reducing and/or eliminating solvents has added economical advantage. However, many of the aqueous release coatings described in the literature are not completely solvent-free systems.

Many of the existing waterborne release coatings involve processes where solvents are used during the polymerization. These processes then require an additional step of distillation or other process(es) to remove the solvents. The drawbacks of this technology are the low solids, the use of solvent during production that raises environmental issues, and the long time required to remove the solvent to invert into water which can result in increased costs. The use of solvents is not desirable due to environmental, economic, and safety reasons.

Thus, there is a need to provide waterborne release coatings that are essentially solvent free, while at the same time providing desirable release, writability, printability, and aging characteristics.

SUMMARY OF THE INVENTION

Briefly, in one aspect of the present invention, polymer latices are provided that are useful as release coatings for pressure-sensitive adhesive (PSA) coated paper and tapes. In yet another aspect, coated articles comprising a layer of the polymer latex compositions of the present invention are provided.

With the ever-present environmental concern to eliminate organic solvents, the use of 100% solids and water-based release coatings is becoming more desirable. The latices of the present invention are waterborne, which is an advantage over the more conventional release coating compositions that are usually comprised of solvent-based polymers, and possess good and stable release characteristics.

The waterborne polymer latices of the present invention comprise:
  (a) latex particles, wherein the latex particles are the polymerization reaction product comprising:
    (1) about 15 to about 45 percent by weight of a silicone containing monomer;
    (2) about 25 to about 85 percent by weight of one or more short chain alkyl acrylate or alkyl methacrylate monomers, wherein the alkyl group contains less than about 12 carbon atoms;
    (3) 0 to about 15 percent by weight of one or more carboxylic acid functional monomers; and
    (4) 0 to about 15 percent by weight of one or more nitrogen containing monomers; such that the combination of components (3) and (4) is greater than 0% by wt, preferably is in the range of greater than 0% to 30% by wt., and more preferably, is in the range of greater than 0% to 15% by wt.;
  (b) an effective amount of an emulsifier or an emulsifier mixture;
  (c) water; and
  (d) optionally, one or more additives.

Silicone containing monomers useful in forming the polymer latices of the present invention can be defined as mercapto functional silicone macromolecular chain transfer agents or silicone-containing macromonomers.

Additives for the above-identified compositions can include fillers, coalescing agents, defoamers, and the like.

The present invention takes advantage of the emulsion polymerization process where all the monomers react to form a polymer in an aqueous medium. The novelty of the invention is the ability to incorporate monomers that provide or contribute to good release characteristics but also have low water solubility (i.e.—silicone-containing monomers). This is accomplished by using a mini-emulsion process that includes a homogenization step rather than a conventional emulsion polymerization approach that does not require any homogenization.

The latices of the present invention provide release during the removal of an adhesive coated sheet of paper from a pad or during unwinding of pressure-sensitive adhesive coated tapes, such as clear tapes, masking tape, packaging tape, etc. Furthermore, the latices advantageously provide for high readhesion, that is, a readhesion in the range of 80% or greater, without the necessity of additional processing to remove free silicone from the latices.

Advantageously, the water-based latices of the present invention are prepared without the use of organic solvents. The release coatings obtained possess good release, writability, printability, and aging properties for conventional pressure-sensitive adhesives.

In another aspect of the present invention, a coated sheet material is provided comprising a flexible sheeting and a release coating covering at least a portion of one major surface of the flexible sheet wherein the release coating is formed by coating the above-described waterborne silicone acrylate latex polymer, which has been diluted as necessary for coating. The coated article thus obtained possesses excellent release, writability, printability, and aging properties.

DESCRIPTION OF THE PREFERRED EMBODIMENTS(S)

Waterborne Release Coating Composition

The latices of the present invention are comprised of a polymer dispersed within an aqueous phase that is stabilized with an emulsifier. The latices are prepared by emulsion copolymerization of silicone containing monomers. The latices provide release during the removal of adhesive coated sheets of paper from a pad or during the unwinding of pressure-sensitive adhesive coated tapes, and the like.

Monomers

Silicone Containing Monomers

Silicone containing monomers useful in forming the polymer latices of the present invention include mercapto functional silicone macromolecular chain transfer agents such as pendant functional mercaptopolydiorganosiloxane copolymers that are described by the following general formula (1):

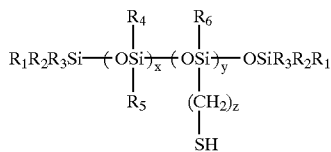

wherein:

R$_1$, R$_2$, and R$_3$ are monovalent moieties that can independently be the same or different and are selected from the group consisting of alkyl, aryl, alkylaryl, alkoxy, alkylamino, hydroxyl, hydrogen, fluoroalkyl, divalent linking groups and are most preferably alkyl moieties;

R$_4$, R$_5$, and R$_6$ are monovalent moieties that can independently be the same or different and are selected from the group consisting of alkyl, aryl, alkylaryl, alkoxy, alkylamino, hydroxyl, hydrogen, fluoroalkyl and are most preferably alkyl moieties;

z can range from 1 to about 16, preferably 1 to 5 and is most preferably 3;

x and y are integers of at least one and the sum of x+y is an integer of 10 or greater; and y can range from 0.5 to about 80% of (x+y); preferably from 1–20% of (x+y) and most preferably from 3.5–14% of (x+y).

A most preferred additive is commercially available from Shin-Etsu, Inc. Akron, Ohio, under the commercial designation of "X-22-980" wherein R$_1$, R$_2$, R$_3$, R$_4$, R$_5$, and R$_6$=CH$_3$, y=3.5 to 4.5% of (x+y), z=3, and the number average molecular weight (Mn)=8000. Additional most preferred additives of varying values of R, x, y, and z are available from Huls America, Inc. (Piscataway, N.J.)

The term silicone containing monomer as used herein also includes silicone macromonomers having the general formula (2):

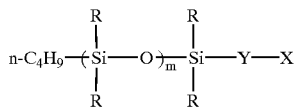

wherein:

X is a polymerizable vinyl group;

Y is a divalent linking group selected from the group consisting of —CH$_2$—, —CH$_2$—CH$_2$—, and —CH$_2$—CH$_2$—CH$_2$—;

m is 20 to 2000;

each R is independently selected from the group consisting of hydrogen, C$_{1-8}$ alkyl, aryl, and alkoxy.

Preferably the formulas of the silicone macromonomer are selected such that X is selected from the group consisting of:

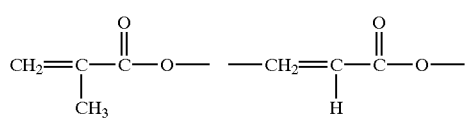

Preferably, the macromonomer is represented by the general formula (4):

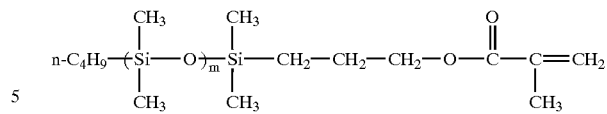

wherein m is 100 to 150, (prepared according to procedures described in U.S. Pat. No. 4,728,571). This monomer is referred to herein as "SiMac".

Preferably the latices of the present invention comprise about 15 to about 45 percent by weight, more preferably 25 to about 45 percent by weight of the silicone containing monomer, based upon the total weight of all of the monomers.

Alkyl Acrylate Monomers

One or more short chain alkyl acrylate or alkyl methacrylate monomers, wherein the alkyl group contains less than about 12 carbon atoms, are useful in forming the polymer latices of the present invention, Useful monomers include but are not limited to those chosen from the group consisting of alkyl esters of acrylic and methacrylic acid, such as methyl acrylate, ethyl acrylate, isobornyl acrylate, hydroxyethyl acrylate, methyl methacrylate, ethyl methacrylate, etc. and mixtures and combinations thereof.

Preferably the latices of the present invention comprise about 25 to about 85 percent by weight, more preferably 45 to about 75 percent by weight of the short chain alkyl acrylate or alkyl methacrylate monomer(s), based upon the total weight of all of the monomers.

Carboxylic Acid Functional Monomers

Carboxylic acid functional monomers useful in forming the polymer latices of the present invention include polymerizable acids such as acrylic acid, methacrylic acid, itaconic acid, maleic acid, etc., and mixtures thereof.

Preferably, the latices of the present invention comprise about 0 to about 15 percent by weight, more preferably about 4 to about 10 percent by weight of the carboxylic acid functional monomer(s), based upon the total weight of all of the monomers.

Nitrogen Containing Monomers

One class of suitable comonomers are amido-functional monomers having a nucleus or portion of the nucleus of the general formula (5):

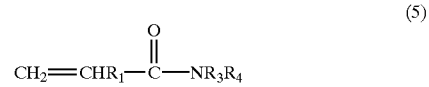

wherein

R$_1$ is H, —CH$_3$, —CH$_2$CH$_3$, cyano or carboxymethyl; and

R$_3$, R$_4$ are independently H or an alkyl group containing 1 to about 12 carbons or an arylalkyl group or together form a cyclic or heterocyclic moiety.

Nonlimiting examples of comonomers according to formula (5) include N-vinyl pyrrolidone, N-vinyl caprolactam, acrylamide or N, N-dimethyl acrylamide.

Another class of suitable comonomers are amino-functional monomers having a nucleus or portion of the nucleus of the general formula (6):

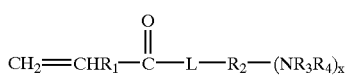

(6)

wherein
  $R_1$ is —H, —CH$_3$, —CH$_2$CH$_3$, cyano or carboxymethyl;
  $R_2$ is a hydrocarbyl radical comprising 1 to about 12 carbon atoms;
  $R_3$ and $R_4$ are independently H or an alkyl group containing 1 to about 12 carbon atoms or an arylalkyl group or together form a cyclic or heterocyclic moiety;
  L is carbon-carbon bond, O, NH or S; and
  x is an integer of 1 to 3.

Nonlimiting examples of comonomers according to formula (6) include N,N-dimethyl-aminoethyl(methyl)acrylate, N,N-dimethylaminopropyl(meth)acrylate, t-butylaminoethyl(methyl)acrylate and N,N-diethylaminoacrylate.

Nonlimiting examples of other suitable comonomers that do not fall within the above classes but are within the scope of permissible comononers include (meth)acrylonitrile, furfuryl (meth)acrylate and tetrahydrofurfuryl (meth)acrylate, 2-vinyl pyridine, and 4-vinyl pyridine and mixtures and combinations thereof.

Preferably, the latices of the present invention comprise about 0 to about 15 percent by weight, more preferably about 4 to about 10 percent by weight of the nitrogen containing monomer(s), based upon the total weight of all of the monomers. Furthermore, any of the above described nitrogen containing monomers can be used in mixtures and combinations thereof, provided the combined % by weight is with the preferred ranges, as described above.

The combination of the short chain alkyl acrylate or methacrylate monomer(s), carboxylic acid functional monomer(s), and the nitrogen containing monomer(s) is such that when polymerized with the silicone containing monomer, a polymer structure is provided having good release and release values that are stable upon aging against pressure-sensitive adhesives, film forming ability (particles propensity to coalesce and form a film), writability, printability, and good surface adhesion of the polymer to a surface when coated.

Emulsifiers

Emulsifiers (also referred to as "surfactants") useful in conventional emulsion polymerization, including the categories of anionic, nonionic, amphoteric, and cationic emulsifiers, may be used in the emulsion polymerization of the release coatings of the present invention.

Useful anionic emulsifiers include but are not limited to the following: sulfosuccinates and derivatives, alkylaryl sulfonates, olefin sulfonates, phosphate esters, sulfates and sulfonates of ethoxylated alkylphenols, sulfates and sulfonates of ethoxylated fatty alcohols, sulfates of fatty esters, and mixtures thereof.

Useful nonionic emulsifiers include but are not limited to the following: ethoxylated fatty alcohols, ethoxylated fatty esters, ethoxylated fatty acids, ethoxylated alkylphenols, ethylene oxide-propylene oxide block copolymers, and mixtures thereof.

Useful cationic emulsifiers include but are not limited to the following: long chain amines and their salts, quaternary ammonium salts, and mixtures thereof.

Useful amphoteric emulsifiers include but are not limited to the following: betaine derivatives, sulfobetaine derivatives, and mixtures thereof.

Polymerizable surfactants, that is, surfactants that possess a vinyl polymerizable group, may also be used. Useful polymerizable surfactants include but are not limited to TREM LF-40 from Henkel, SAM 211-80 from PPG Industries, and Hitenol BC-10 from DKS International, Inc., and mixtures thereof. Mixtures of polymerizable surfactants with conventional non-polymerizable surfactants may be also employed.

Polymeric stabilizers such as poly(vinyl alcohol), cellulosics such as hydroxyethyl cellulose, poly(acrylic acid) and so on may also be used alone or in combination with other emulsifiers.

The Hydrophilic-Lypophilic Balance (HLB) of a surfactant is an expression of the balance of the size and strength of the hydrophilic groups and the lypophilic groups of the surfactant. In general, the HLB value of each emulsifier can be used as a guide for choosing a proper emulsifier or emulsifier combination. Typically, an emulsifier possessing an HLB value greater than 8 is appropriate for preparing the emulsion latices of the present invention. However, this value should not be taken to limit the type of emulsifier used, provided the emulsifier or emulsifier combination functions as an emulsifier in the polymerization process. Furthermore, the emulsifier or mixture of emulsifiers are added to the emulsion in an amount sufficiently effective to function as an emulsifier.

Preferably, the emulsion polymerization of this invention uses a mixture of an anionic and a nonionic emulsifier or a mixture of a polymerizable surfactant and an anionic emulsifier. A particularly useful range of emulsifier concentration is from about 0.5 to about 8 weight percent based on the total weight of all of the monomers.

Initiators

Initiators useful in the emulsion polymerization process of the present invention are well known to those skilled in the art and are described in Emulsion Polymerization, D. C. Blackley, 1975, Chap. 6, Applied Science Publishers, Ltd., London.

It is conventional to subdivide initiators into two broad classes: (a) dissociative initiators and (b) redox initiators. Preferably, the initiator selected is a water-soluble initiator, such as potassium or ammonium persulfate, hydrogen peroxide and 2,2'-azobis(2-amidoinopropane)dihydrochloride. Partially water-soluble peroxides such as succinic acid peroxide and t-butyl hydroperoxide and azo compounds such as 4,4'-azobis(4-cyanopentanoic acid) are also useful. Redox systems such as persulfate with ferrous ion are also commonly used. Redox systems are advantageous in yielding desirable initiation rates at temperatures below 50° C. Other useful redox systems include cumyl hydroperoxide or hydrogen peroxide with ferrous, sulfite or bisulfite ion. Oil soluble initiators may also be used.

Initiators are added to the emulsion in catalytically effective amounts to initiate polymerization and such amounts typically range from 0.05% to 1% based on the total weight of the monomers.

Molecular Weight Modifiers

Although not required in the invention, modifiers can be used to adjust the polymeric properties of the latex polymer. Chain transfer agents are used to limit the molecular weight of the polymer. Non-limiting examples include: carbon tetrabromide, iso-octyl thioglycolate, and tertiary dodecyl mercaptan. Crosslinking agents may be used to increase the molecular weight of the polymer. Examples of useful crosslinking agents include, but are not limited to multifunctional (meth)acrylate(s) e.g. hexanediol diacrylate or butanediol diacrylate or other multi-functional crosslinkers such as divinylbenzene and mixtures thereof.

pH Buffers

Depending upon the monomer composition, the type of emulsifier, and the type of initiator selected, it may be desirable to maintain the pH of the emulsion polymerization system within a certain range. Useful pH buffers include sodium bicarbonate, sodium hydrogen phosphate, and the like.

Other Additives

The latex prepared according to the method of the invention may be used alone as a release coating or alternatively various additives well known in the art such as pH modifiers, coalescing agents, rheology modifiers, and defoamers, may be added. pH modifiers, such as ammonium hydroxide, sodium hydroxide, and so on may be use to adjust the pH of the latex depending on the application. Coalescing agents may be admixed with the latex in order to ensure adequate coverage of a coating thereof onto a substrate. Useful coalescing agents include but are not limited to N-methyl pyrrolidone, the Carbitol™ series of poly(ethylene glycol) alkyl ethers (available from Union Carbide), and mixtures thereof. Poly(ethylene glycol) at different molecular weights can be also added. Rheology modifiers may be added as well to improve the theological properties of the latex. Useful rheology modifiers include but are not limited to Kelzan® series (available from Kelco), hydroxyethyl cellulose, UCAR® Polyphobe series (available from Union Carbide), and mixtures thereof. Defoamers can also be added in the applications in which foam is generated. Useful defoamers include but are not limited to: Surfynol® series (available from Air Products), Antifoam H-10 Emulsion (available from Dow Corning), and mixtures. thereof. In addition other optional adjuvants may be added, such as colorants, fillers, stabilizers, etc. If such adjuvants are used, the amounts used in the latex are amounts effective for the known uses of such adjuvants.

Emulsion Polymerization Process

The polymers of this invention comprise silicone-containing monomers. These monomers, due to low water solubility (for example, long chain alkyl acrylates have a solubility of less than 200 millimole/liter at 20 to 50° C. and silicone-containing monomers have similar or even less solutibility than the alkyl acrylates), present important challenges if they are to be incorporated into the synthesis of waterborne latices. In order to overcome this difficulty, a homogenization step is conducted to improve the reactivity of the silicone containing monomers. By homogenizing the monomers the size of the monomer droplets are greatly reduced (less than or equal to about 0.5 micrometers) allowing them to compete with the micelles for radical absorption. This way, the silicone containing monomers that remain in the monomer droplets due to their limited solubility can also polymerize.

In the present invention a batch polymerization process is used. A vessel is charged with water and an emulsifier or an emulsifier mixture, and the mixture is stirred until the emulsifier is dissolved. The monomers are then added and the resultant mixture is adequately homogenized, wherein the adequacy of homogenization is typically determined by droplet size; for example, droplets having a diameter in the range of 0.1 to 0.5 μm, typically indicate that the dispersion is adequately homogenized. Homogenization can be accomplished using conventional homogenizers such as a Waring™ blender (available from Dynamics Corporation of America), a Manton-Gaulin™ homogenizer (available from Gaulin Corporation), a Microfluidizer™ homogenizer (available from Microfluidics Corporation), a colloid mill, a Sonifier™ homogenizer (available from Bronson Ultrasonics Corporation), a rotor-stator type homogenizer, etc. The emulsion (that is, the homogenized dispersion) thus obtained is then charged into a reactor and an initiator solution containing initiator, buffer, and water is added to the emulsion. Optionally the initiator solution can be added to the mixture prior to the homogenization, provided that the initiator is not sufficiently activated to commence polymerization until the monomers have been homogenized. The reaction mixture is then stirred and heated to the reaction temperature under a nitrogen blanket and the polymerization is allowed to proceed until the monomer conversion is greater than about 90%.

Although a batch polymerization is used in this invention, a semi-batch or two-stage polymerization can also be used. In the first stage the silicone-containing monomer and at least one of the other monomers are added to the emulsifier solution in water and are then homogenized to form an emulsion. The emulsion is then charged to the reactor vessel, the initiator solution is added, and the reaction mixture is stirred and heated to the reaction temperature under a nitrogen blanket. One or more of the remaining monomers are then added dropwise to the reactor. Preferably, the addition of the remaining monomers is started after allowing the first stage monomers to polymerize to about 0 to about 40%. After additional heating and stirring, the latex is collected. Generally the polymerization is allowed to proceed until the monomer conversion is greater than about 90%.

Coated Sheet Materials

The latices of the present invention are typically best used as a coating for a solid substrate, such as a sheet, a fiber or a shaped object. However, the preferred substrates are those that are typically used for pressure-sensitive adhesive products. Such substrates include but are not limited to paper, metal sheets and foils, nonwoven fabrics, cellophane, films of thermoplastic resins such as polyesters, polyamides, polyolefins, polycarbonates, polyvinyl chloride, and acetate films. Primers known in the art can be used to aid in the adhesion of the latex coating to the substrate, although this is not necessary.

The desired concentration of the latex coating depends upon the method of coating, and the desired coating thickness. The latex composition may be diluted with water to a lower concentration, for example about 1 to about 20 wt. % solids.

The coating composition may be applied to a suitable substrate by means of conventional coating techniques such as wire-wound rod, direct gravure, offset gravure, reverse roll, chute or slot die, air-knife and trailing blade coating. The resultant coatings provide effective release for a wide variety of conventional pressure-sensitive adhesives, such as natural rubber-based, acrylic and other synthetic elastomeric materials. The release level can be tailored with release levels as low as the 0.5 grams/cm range for microsphere adhesives.

This invention provides a coated sheet material wherein the release coating is on one side of the sheet and the adhesive is on the other side. The invention further provides a coated sheet material wherein the adhesive is a normally tacky and pressure sensitive adhesive, for example, cured hot melts, tacky pressure sensitive adhesives, post-curable adhesives, and microsphere adhesives and coatings. The invention also provides a stack of superimposed sheets of coated sheet material, the pressure-sensitive adhesive on each sheet being in contact with the release coating on an immediately adjacent sheet.

The invention also provides a fanfolded web formed from the coated sheet material, the adhesive on each segment of the web being in contact with the release coating on an immediately adjacent segment. The invention also provides the coated sheet material wherein the adhesive is present in a band adjacent to one edge of the sheet.

The present invention also provides a roll of tape that includes a flexible backing member, a pressure-sensitive adhesive coating on one major surface of the backing member and a release coating on the opposite major surface of the backing comprising the waterborne silicone acrylate latex polymer of the present invention.

This invention also provides for clear tapes, masking tapes, packaging tapes, adhesive-coated papers, and the like. The invention also provides for any article wherein normally tacky, pressure-sensitive adhesive is coated onto a backing or substrate and is in contact with the release coating on an immediately adjacent sheet or surface, such as a roll of tape. Furthermore, this invention also provides for construction of release liners or sheets, wherein the release coating is coated onto either one or both major surfaces of backing or substrate. Such substrates, in all instances, can be paper, polyester films, polyolefin films and the like.

The objects, features and advantages of the present invention are further illustrated by the following examples, but the particular materials and amounts thereof recited in these examples, as well as other conditions and details, should not be construed to unduly limit this invention. All materials are commercially available or known to those skilled in the art unless otherwise stated or apparent. All parts and percentages in the Examples and the Specification are by weight, unless otherwise specified.

EXAMPLES

Test Methods

Release with Pressure Sensitive Adhesive Tape

This release test was used to measure the amount of force required to remove a strip of a pressure sensitive adhesive tape from the release coated substrate at a specific peel angle and peel rate.

A sample (15.2 cm×25.4 cm) of the test specimen was applied (release coated side up) to the test plate of a tensile tester (Instron® Model #1122, available from Instron Corp., Canton, Mass.) using double coated adhesive tape. A 2.54 cm wide strip of Scotch™ Magic™ 810 Tape (available from 3M Company, St. Paul, Minn.) was applied to the release coated surface of the test specimen leaving a free end. The strip of Scotch™ Magic™ 810 Tape was firmly applied to the test specimen by rolling over the sample twice by hand with a 4.5 pound (2 kilogram) hard rubber roller. The free end of the strip of the Scotch™ Magic™ 810 Tape was attached to the load cell of the tensile tester such that the peel angle was maintained at 90 degrees. The test plate was then clamped into the jaws of the tensile tester and the peel force (in grams) was recorded at a constant peel rate of 30.8 cm/minute. The release values reported in the Tables are an average of three tests.

Release with Pressure Sensitive Adhesive Coated Paper

This release test was used to measure the amount of force required to remove a strip of a pressure sensitive adhesive coated paper from the release coated substrate at a specific peel angle and peel rate.

The adhesive side of a sheet (15.2 cm×15.2 cm) of adhesive coated paper (Post-it® Note available from 3M Company, St. Paul, Minn.) was applied to the test specimen (release coated side up) and the laminate was clamped in a press for 30 seconds using a manual laminating hydraulic press (Mini C Model # 3850 available from Carver, Inc, Wabash, Ind.) such that the pressure applied to the sample was 110 psi (7.7 kg/cm$^2$). Approximately half an inch of the adhesive coated paper was peeled back by hand and a 2.54 cm wide strip of the Scotch™ Magic™ 810 Tape was applied to this edge of the adhesive coated paper leaving a free end on the strip of Scotch™ Magic™ 810 Tape. The free end of the strip of the Scotch™ Magic™ 810 Tape was then attached to the load cell of the tensile tester such that the peel angle was maintained at 90 degrees. The test plate was then clamped into the jaws of the tensile tester and the peel force (in grams) was recorded at a constant peel rate of 30.8 cm/minute. The release values reported in the Tables are an average of three tests.

Readhesion Test

The readhesion test was used to measure the force required to remove a 1 mil (0.025 m) thick, smooth polyester film from the adhesive surface of the adhesive coated paper that was removed from the release coated test specimen in the release test procedure described above. The test gives an indication as to whether any of the release coating was transferred to the adhesive, which can affect the tack and adhesion properties of the adhesive.

The adhesive coated sheet was applied (adhesive coated side up) to the test plate of a tensile tester (Instron® Model #1122, available from Instron, Corp., Canton, Mass.) using a double coated adhesive tape. A 3.18 cm wide strip of polyester film was applied to the adhesive surface of the adhesive coated paper leaving a free end. A 4.5 pound (2 kilogram) hard rubber roller was used to firmly apply the polyester film strip to the adhesive coated paper by rolling over the sample twice by hand. The free end of the polyester film strip was attached to the load cell of the tensile tester such that the peel angle was maintained at 90 degrees. The test plate was then clamped into the jaws of the tensile tester and the peel force (in grams) was recorded at a constant peel rate of 30.8 cm/minute. The readhesion values reported in the Tables are an average of three tests.

All above test methods are performed after the samples have been equilibrated to the testing room environment of 21 ° C./50% RH for a period of 24 hours.

Materials

"X-22-980" is a mercaptofunctional silicone having a number average molecular weight (Mn) of approximately 8000, available from Shin-Etsu, Inc., Akron, Ohio.

"SiMac" is silicone macromonomer (3-methacryloxy propyl-terminated poly dimethylsiloxane having a molecular weight of approximately 10,000 (prepared according to procedures described in U.S. Pat. No. 4,728,571).

MA is methyl acrylate

AA is acrylic acid

NVP is N-vinyl pyrrollidone n-VC is N-vinyl caprolactam

MMA is methyl methacrylate

MAA is methacrylic acid

EA is ethyl acrylate

Siponate DS-10 is a sodium dodecyl benzene sulfonate surfactant, presently available as Rhodacal DS-10 from Rhodia, Inc.

Igepal CA-897 is an octyl phenoxy polyethoxy ethanol available from Rhodia, Inc.

SAM 211-80 is an alkylene polyalkoxy sulfate polymerizable surfactant available from PPG Industries.

EXAMPLES

Example 1

In a typical latex preparation, the surfactant was first dissolved in deionized water in a flask. The monomers were then added to the surfactant solution. The mixture was then homogenized at 5000 psi (351.5 kg/cm$^2$) in an APV homogenizer (Manton-Gaulin™ type available from Gaulin Corp.) The resulting emulsion was then placed in a reaction flask equipped with a nitrogen purge, a thermometer, a mechanical stirrer, and a reflux condenser. An initiator solution (initiator+buffer+water) that was equal to 3% of the total water amount was then added to the emulsion. The amount of water used was enough to dissolve the initiator and buffer. Potassium persulfate was used as the initiator and sodium bicarbonate was used as the buffer. The initiator and buffer amounts were approximately 0.11 weight % each based on the total amount of water in the reaction mixture. Then the nitrogen purge, condenser cooling water, and the mechanical stirrer (200 rpm) were turned on and the mixture was heated to 60° C. Once the reaction mixture reached 60° C., the nitrogen was turned off and the mixture was maintained at 60° C. for 8 hours with stirring. A stable latex was obtained.

Examples 2–18

Examples 2–18 were prepared according to the procedure of Example 1. The amounts of the various components are set forth in Table 1.

Regarding Examples 1–18, all the formulations are 30% solids. In the formulations where Siponate DS-10 and Igepal CA-897 were used as surfactants, they were 1.5 and 1.35 weight % based on total monomer, respectively. In formulations where a polymerizable surfactant (SAM 211-80) and Siponate DS-10 were used as surfactants, the amounts were 2.5 and 0.5 weight % based on total monomer, respectively.

The latices of Examples 1–18 were then evaluated as a waterborne release coatings according to the following procedure. A portion of the latex was diluted to a lower %solids solution that was then coated onto a 20 pound paper at 50 feet/minute (15.2 m/min.) using a slot die. The coated web was then dried by passing the web over heated rollers maintained at approximately 118° C. The dry coating weight for the release coated paper was 0.04 grams/30.5 cm$^2$ given in Table 2. The release coated paper was then tested for Release and Readhesion according to the test methods described above. Test results are given in Table 2.

Comparative Example C-19

Comparative Example C-19 was prepared in a manner similar to Example 2, except there was no homogenization step. At the end of the polymerization it was observed that two layers had formed. The surface of top layer had an oily appearance. Additionally, when a small portion of the mixture was dried it had an oily appearance and a greasy feel, which suggested that there was unreacted silicone present.

TABLE 1

| Example | Monomers | Monomer Composition | Surfactant(s) |
|---|---|---|---|
| 1 | X-22-980/MA/AA/NVP | 45/44/4/7 | SAM 211-80 & Siponate DS-10 |
| 2 | " | 35/54/4/7 | SAM 211-80 & Siponate DS-10 |
| 3 | " | 25/64/4/7 | SAM 211-80 & Siponate DS-10 |
| 4 | " | 15/74/4/7 | SAM 211-80 & Siponate DS-10 |
| 5 | " | 35/58/0/7 | SAM 211-80 & Siponate DS-10 |
| 6 | " | 35/51/7/7 | SAM 211-80 & Siponate DS-10 |
| 7 | " | 35/48/10/7 | SAM 211-80 & Siponate DS-10 |
| 8 | " | 35/61/4/0 | SAM 211-80 & Siponate DS-10 |
| 9 | " | 35/51/4/10 | SAM 211-80 & Siponate DS-10 |
| 10 | " | 35/46/4/15 | SAM 211-80 & Siponate DS-10 |
| 11 | X-22-980/MA/AA/AN | 35/54/4/7 | Siponate DS-10 & Igepal CA 187 |
| 12 | X-22-980/MA/AA/n-VC | 35/54/4/7 | Siponate DS-10 & Igepal CA 187 |
| 13 | X-22-980/MA/EA/AA/NVP | 35/27/27/4/7 | Siponate DS-10 & Igepal CA 187 |
| 14 | X-22-980/MA/AA/NVP | 35/54/4/7 | Siponate DS-10 & Igepal CA 187 |
| 15 | X-22-980/MA/MAA/NVP | 35/54/4/7 | SAM 211-80 & Siponate DS-10 |
| 16 | SiMac/MA/AA/NVP | 30/59/4/7 | SAM 211-80 & Siponate DS-10 |
| 17 | SiMac/MA/MMA/NVP | 30/59/4/7 | SAM 211-80 & Siponate DS-10 |
| 18 | SiMac/MA/AA | 30/66/4 | SAM 211-80 & Siponate DS-10 |
| C19 | X-22-980/MA/AA/NVP | 35/54/4/7 | SAM 211-80 & Siponate DS-10 |

TABLE 2

| Example | Release with Scotch Magic™ Tape 810 (grams/cm) | Release with Post-it® Notes (grams/cm) | Readhesion with Post-it Notes* (grams/cm) |
|---|---|---|---|
| 1 | 19.7 | 6.1 | 25.8 |
| 2 | 19.7 | 5.3 | 26.7 |
| 3 | 26.0 | 7.3 | 25.3 |
| 4 | 37.4 | 9.8 | 25.6 |
| 5 | 24.4 | 5.6 | 25.5 |
| 6 | 21.3 | 6.2 | 24.2 |
| 7 | 21.3 | 6.7 | 25.9 |
| 8 | 23.6 | 6.1 | 25.2 |
| 9 | 15.0 | 5.1 | 23.2 |
| 10 | 26.0 | 6.3 | 26.1 |
| 11 | 22.8 | 7.4 | 25.9 |
| 12 | 23.6 | 7.6 | 26.8 |
| 13 | 19.7 | 6.9 | 23.4 |
| 14 | 38.6 | 12.1 | 27.2 |
| 15 | 35.0 | 10.3 | 27.0 |
| 16 | 28.7 | 7.6 | 26.7 |
| 17 | 24.4 | 7.8 | 25.7 |
| 18 | 31.9 | 8.1 | 25.6 |
| C19 | Not tested | Not tested | not tested |

*For comparison, Post-it® Note adhesion was measured and determined to be 28.0 grams/cm (an average of 5 samples).

What is claimed:
1. A waterborne release coating comprising:

(a) latex particles, wherein the latex particles are the polymerization reaction product comprising:
  (1) about 15 to about 45 percent by weight of a silicone containing monomer wherein the silicone containing monomer includes silicone macromonomers having the general formula (2):

$$\text{n-C}_4\text{H}_9-(\overset{R}{\underset{R}{\text{Si}}}-\text{O})_m-\overset{R}{\underset{R}{\text{Si}}}---\text{Y}-\text{X} \quad (2)$$

wherein:
X is a polymerizable vinyl group; Y is a divalent linking group selected from the group consisting of $-CH_2-$, $-CH_2-CH_2-$, and $-CH_2-CH_2-CH_2-$; m is 20 to 2000; each R is independently selected from the group consisting of hydrogen, $C_{1-8}$ alkyl, aryl, and alkoxy;

(2) about 25 to about 85 percent by weight of one or more short chain alkyl acrylate or alkyl methacrylate monomers, wherein the alkyl group contains less than about 12 carbon atoms;

(3) 0 to about 15 percent by weight of one or more carboxylic acid functional monomers; and (4) 0 to about 15 percent by weight of one or more nitrogen containing monomers; such that the combination of components (3) and (4) is greater than 0% by wt;

(b) an effective amount of an emulsifier or an emulsifier mixture;

(c) water; and (d) optionally, one or more additives.

2. The waterborne release coating according to claim 1, wherein the macromonomer is represented by the general formula (4):

$$\text{n}-\text{C}_4\text{H}_9-(\overset{CH_3}{\underset{CH_3}{\text{Si}}}-\text{O})_m-\overset{CH_3}{\underset{CH_3}{\text{Si}}}-\text{CH}_2-\text{CH}_2-\text{CH}_2-\text{O}-\overset{O}{\underset{}{\text{C}}}-\overset{}{\underset{CH_3}{\text{C}}}=\text{CH}_2 \quad (4)$$

wherein m is 100 to 150.

3. The waterborne release coating according to claim 1, wherein the short chain alkyl acrylate or alkyl methacrylate monomers are selected from the group consisting of alkyl esters of acrylic and methacrylic acid, such as methyl acrylate, ethyl acrylate, isobornyl acrylate, hydroxyethyl acrylate, methyl methacrylate, ethyl methacrylate, and mixtures and combinations thereof.

4. The waterborne release coating according to claim 1, wherein the carboxylic acid functional monomers include polymerizable acids such as acrylic acid, methacrylic acid, itaconic acid, maleic acid, and combinations and mixtures thereof.

5. The waterborne release coating according to claim 1, wherein the nitrogen containing monomer includes nitrogen containing monomers having having a nucleus or portion of the nucleus of the general formula (5):

$$\text{CH}_2=\text{CHR}_1-\overset{O}{\underset{}{\text{C}}}-\text{NR}_3\text{R}_4 \quad (5)$$

wherein $R_1$ is H, $-CH_3$, $-CH_2CH_3$, cyano or carboxymethyl; and $R_3$, $R_4$ are independently H or an alkyl group containing 1 to about 12 carbons or an arylalkyl group or together form a cyclic or heterocyclic moiety.

6. The waterborne release coating according to claim 1, wherein the nitrogen containing monomer includes nitrogen containing monomers having having a nucleus or portion of the nucleus of the general formula (6):

$$\text{CH}_2=\text{CHR}_1-\overset{O}{\underset{}{\text{C}}}-\text{L}-\text{R}_2-(\text{NR}_3\text{R}_4)_x \quad (6)$$

wherein $R_1$ is $-H$, $-CH_3$, $-CH_2CH_3$, cyano or carboxymethyl;

$R_2$ is a hydrocarbyl radical comprising 1 to about 12 carbon atoms;

$R_3$ and $R_4$ are independently H or an alkyl group containing 1 to about 12 carbon atoms or an arylalkyl group or together form a cyclic or heterocyclic moiety;

L is carbon-carbon bond, O, NH or S; and x is an integer of 1 to 3.

7. The waterborne release coating according to claim 1, wherein the nitrogen containing monomer (meth)acrylonitrile, furfuryl (meth)acrylate and tetrahydrofurfuryl (meth)acrylate, 2-vinyl pyridine, 4-vinyl pyridine or mixtures and combinations thereof.

8. A waterborne release coating comprising:

(a) latex particles, wherein the latex particles are the polymerization reaction product comprising:

(1) about 15 to about 45 percent by weight of a silicone containing monomer is a silicone-containing macromonomer having the general formula:

$$\text{n}-\text{C}_4\text{H}_9-(\overset{R}{\underset{R}{\text{Si}}}-\text{O})_m-\overset{R}{\underset{R}{\text{Si}}}-\text{Y}-\text{X}$$

wherein X is selected from the group of:

$$\text{CH}_2=\overset{}{\underset{CH_3}{\text{C}}}-\overset{O}{\underset{}{\text{C}}}-\text{O}- \quad -\text{CH}_2=\overset{}{\underset{H}{\text{C}}}-\overset{O}{\underset{}{\text{C}}}-\text{O}-$$

Y is a divalent linking group selected from the group consisting of $-CH_2-$, $CH_2-CH_2-$, and $-CH_2-CH_2-CH_2-$; m is 20 to 2000; each R is independently selected from the group consisting of hydrogen, $C_{1-8}$ alkyl, aryl, and alkoxy;

(2) about 25 to about 85 percent by weight of one or more short chain alkyl acrylate or alkyl methacrylate monomers, wherein the alkyl group contains less than about 12 carbon atoms;

(3) 0 to about 15 percent by weight of one or more carboxylic acid functional monomers; and (4) 0 to about 15 percent by weight of one or more nitrogen containing monomers; such that the combination of components (3) and (4) is greater than 0% by wt;

(b) an effective amount of an emulsifier or an emulsifier mixture;

(c) water; and (d) optionally, one or more additives.

* * * * *